United States Patent
Saleem et al.

Patent Number: 5,669,537
Date of Patent: Sep. 23, 1997

[54] PORTABLE MULTI-POSITION VEHICLE STORAGE UNIT

[75] Inventors: Abbas A. Saleem, Dearborn Heights; William C. Bauer, Farmington Hills; John M. McGuckin, Ann Arbor; Mathew A. Demars, Canton; David H. Grandinett, Livonia, all of Mich.

[73] Assignee: Ford Global Technologies, Inc., Dearborn, Mich.

[21] Appl. No.: 660,220

[22] Filed: Jun. 3, 1996

[51] Int. Cl.$^6$ .................................................. B60R 7/02
[52] U.S. Cl. .................. 224/539; 224/542; 224/42.32; 224/484; 296/37.1
[58] Field of Search .................. 224/539, 542, 224/543, 555, 42.32, 42.33, 42.34, 484, 485; 296/37.1, 37.6; 108/13, 14, 16, 193; 312/126, 128, 132, 301, 321, 240; 211/10, 12

[56] References Cited

U.S. PATENT DOCUMENTS

| | | | |
|---|---|---|---|
| 1,195,786 | 8/1916 | Cypert | 224/485 |
| 2,541,702 | 2/1951 | Katz | 224/543 |
| 3,872,975 | 3/1975 | Silver | 211/178 R |
| 4,189,056 | 2/1980 | Majewski | 211/195 |
| 4,718,584 | 1/1988 | Schoeny | 224/42.42 |
| 5,007,569 | 4/1991 | Zarb | 224/539 |
| 5,324,089 | 6/1994 | Schlachter | 296/37.5 |
| 5,379,906 | 1/1995 | Levin et al. | 211/195 |
| 5,381,940 | 1/1995 | Wright | 224/42.42 |
| 5,526,972 | 6/1996 | Frazier et al. | 296/37.1 |

*Primary Examiner*—Renee S. Luebke
*Assistant Examiner*—Charles R. Eloshway
*Attorney, Agent, or Firm*—David B. Kelley

[57] ABSTRACT

A storage unit for an automotive vehicle storage area, defined by a floor bounded by generally vertically extending vehicle panels, has a base member, a pair of side supports attached at opposing ends of the base members, a pair of side members hingedly attached to the pair of side supports for pivotable movement between the deployed position and a stored position, a track system on a storage area facing surface of the side members, at least one removable shelf cooperative with the track system for alternatively dividing the storage area into generally vertical or horizontal storage compartments, and manually operable lock members attached to an outboard surface of the side supports and side members for releasable engagement with a lock engagement attached to the vehicle panels. The storage unit has an installed position for dividing the storage area into alternately vertical or horizontal storage compartments, and is collapsible into a transportable position for convenient transit when not installed in the storage area.

18 Claims, 8 Drawing Sheets

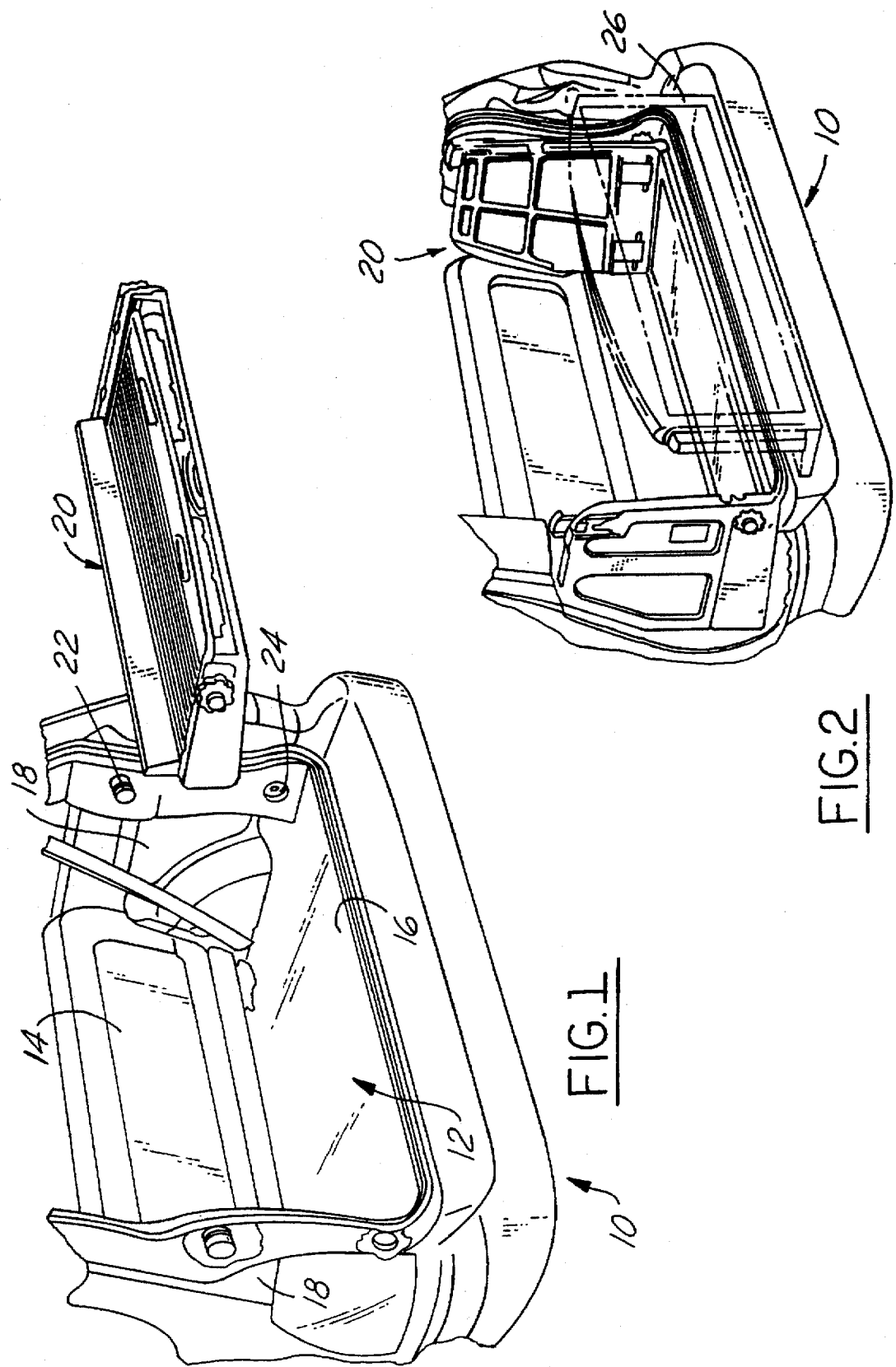

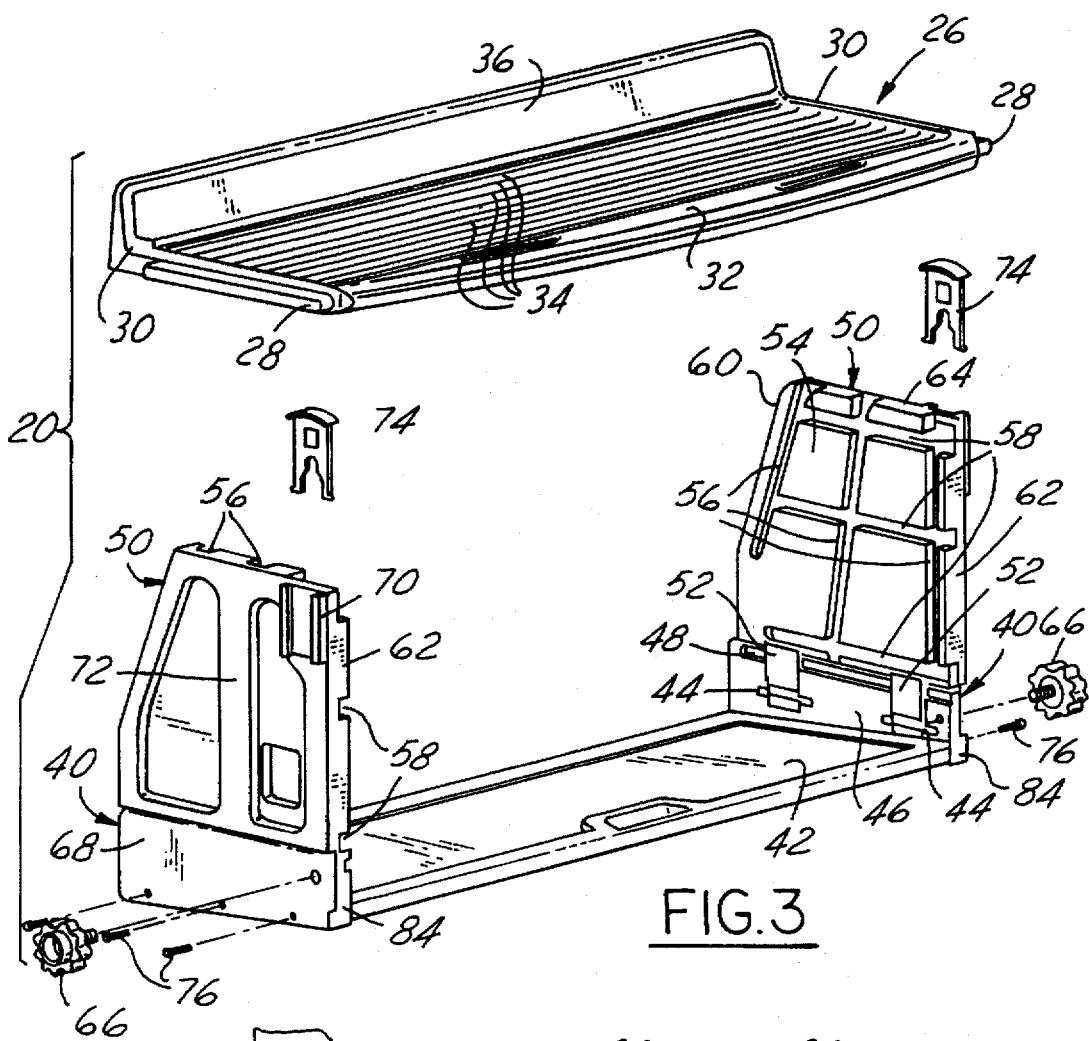
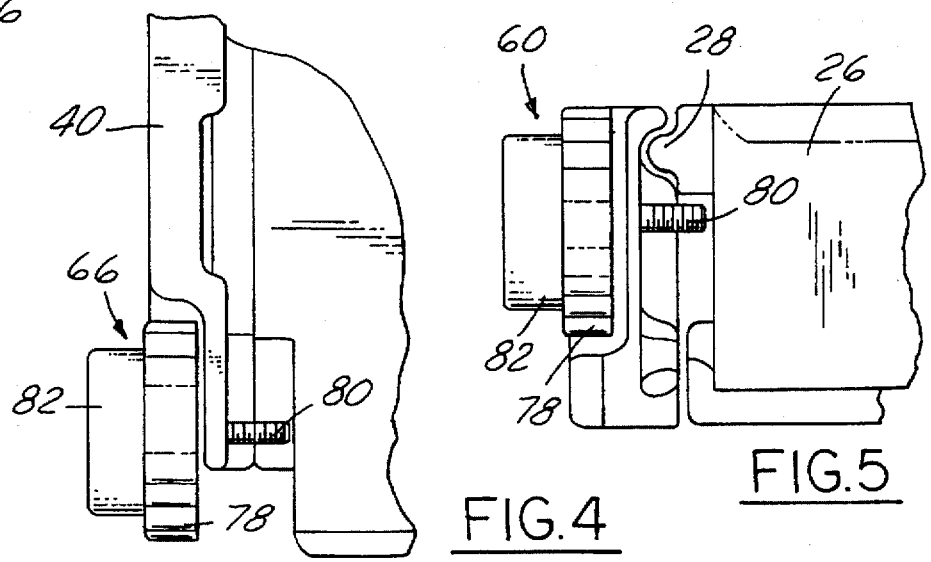

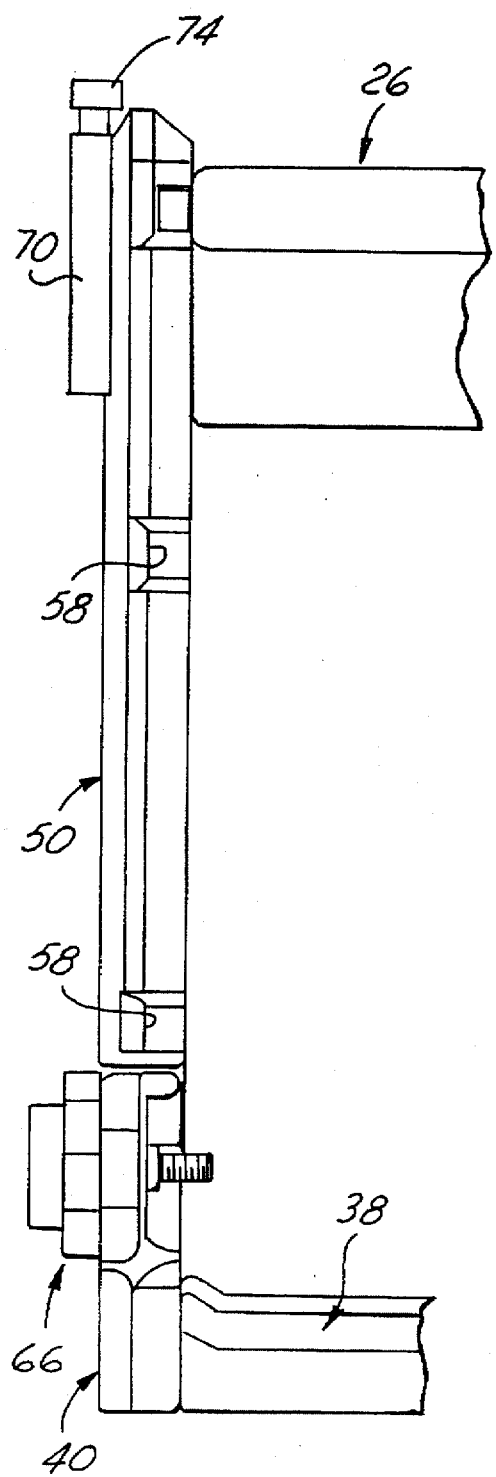
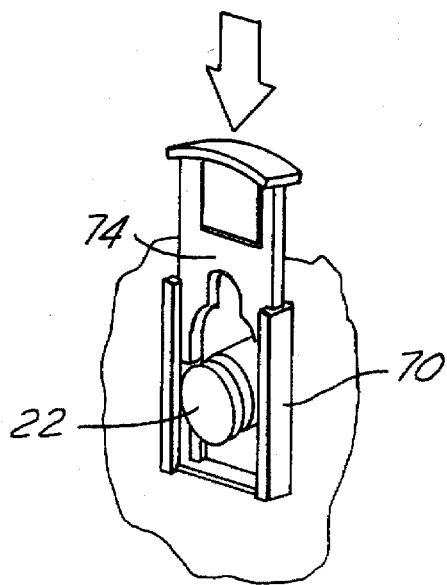
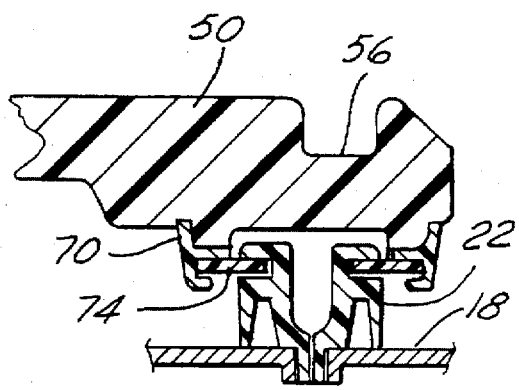
FIG. 7
FIG. 8
FIG. 9

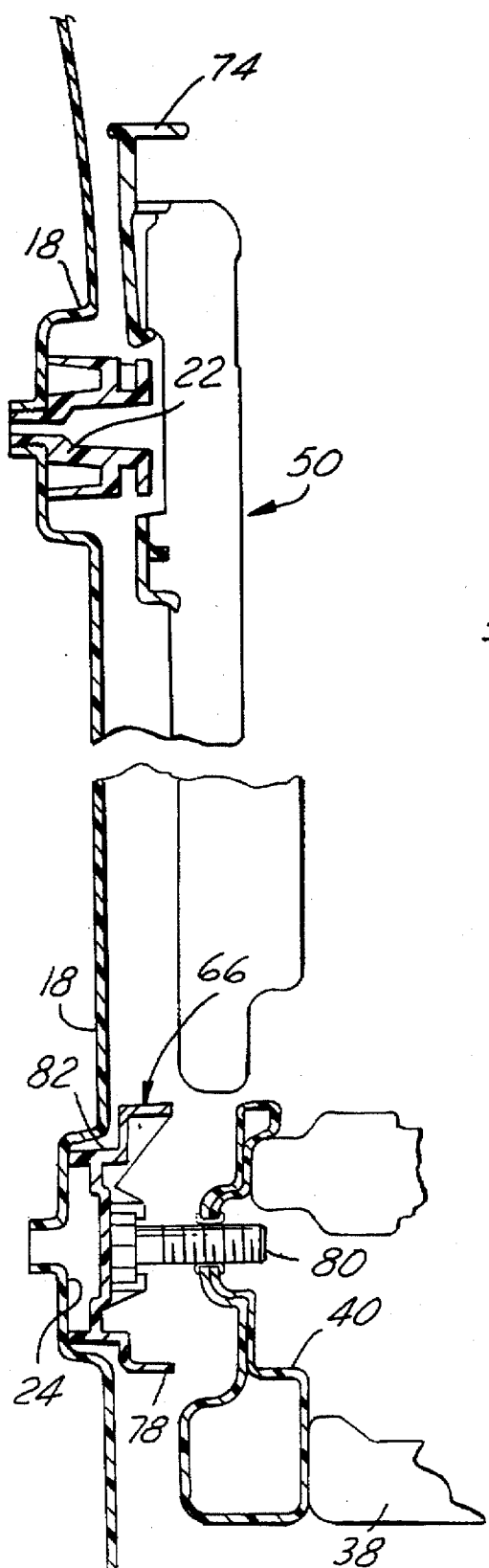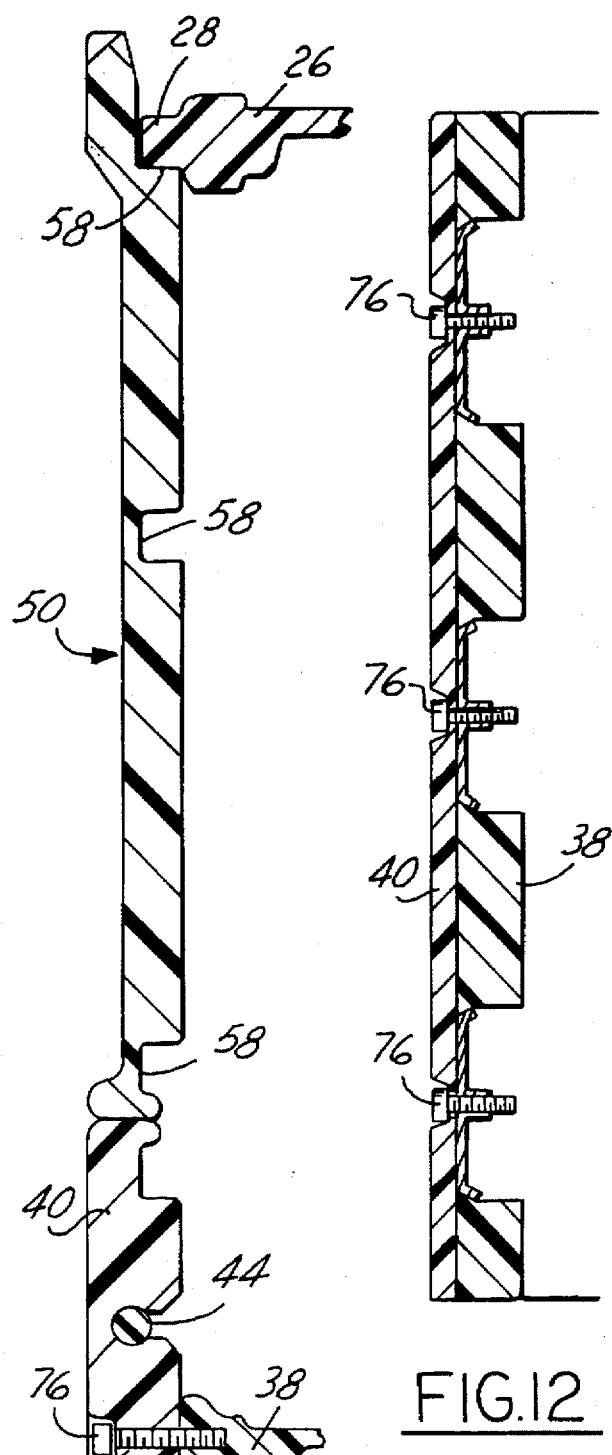

1

PORTABLE MULTI-POSITION VEHICLE STORAGE UNIT

FIELD OF THE INVENTION

The present invention relates to automotive vehicle cargo area storage units and organizers.

BACKGROUND OF THE INVENTION

Automotive designers have incorporated cargo storage space into vehicles almost since the advent of the automobile. Typically, the storage space is a trunk in a sedan type vehicle, or an area behind the seats in the passenger compartment of a van, jeep or hatchback type vehicle. The storage space may have a horizontal floor or bed surrounded by generally vertical walls or panels of the vehicle body. The space thus defined holds cargo and other items which fit therein. Many vehicles have a carpet or other padded accouterment on the floor to cushion stored items.

Receptacles are known for dividing the vehicle storage space into compartments to prevent movement of items stored therein. U.S. Pat. No. 2,541,702 (Katz) discloses a plurality of horizontally and vertically spaced storage compartments in a removable receptacle for an automobile trunk. Each compartment may be open, provided with a door 14, or a drawer 15. The receptacle has drawbacks, in that it is not easily secured to the vehicle and is not readily portable.

In U.S. Pat. No. 5,379,906 (Levin et al.), a foldable organizer has vertically hinged panels which form spaced, vertically extending compartments. The panels forming a compartment are adjustable and collapsible so that the organizer may fit into varying spaces within the storage area. The foldable organizer is not, however, easily securable to the vehicle body, lacks provision for horizontal shelving, and does not have a carpet protection surface.

Other devices for vehicle storage space organization include trays, racks and other such accessories. A portable shopping rack is disclosed in U.S. Pat. No. 4,189,056 (Majewski) which has a back, base, sides and partitions forming vertically extending compartments. The rack is not secured to the vehicle, however, so that it may move within the storage space contributing to noise, squeak and rattle, while also potentially leading to damage of the items therein. In addition, the rack does not provide for horizontal compartments.

An organizational tray is disclosed in U.S. Pat. No. 5,381,940 (Wright) having a bottom, side walls and depressions in one embodiment, and divider ribs in another, to prevent containers placed therein from tipping. In U.S. Pat. No. 4,718,584 (Schoeny), an automobile hatch accessory is disclosed which has a base, back flap, and side flaps swingably attached to the base which can be folded outwards to form vertical compartments for retaining small articles. These devices also have the drawbacks of failing to make provision for horizontal compartments and are not securely attached to the vehicle.

There is, therefore, a need for a vehicle storage compartmentalizing unit which is collapsible, portable, easily secured to the vehicle when in an installed position, and which has provision for alternately dividing the storage space into vertical compartments or horizontal compartments.

SUMMARY OF THE INVENTION

In response to the noted deficiencies in the related art, the present invention provides a new and improved storage unit for an automotive vehicle storage area. The storage area of the vehicle is defined by a floor bounded by generally vertically extending vehicle panels, such as found in the rear of minivans, station wagons, and the like. The storage unit has a base member which is generally flat so as to lie in contact with the vehicle floor. A pair of side members are hingedly attached on opposite ends of the base member for pivotal movement onto an upper surface of the base member. Preferably, the pair of side members are hingedly attached to a pair of side supports which are attached at opposing ends of the base member perpendicularly to a base plane formed thereby. The side members can thus pivot between a deployed position substantially perpendicular to the base plane, and a stored position substantially horizontal with the base plane. In the deployed position, the side members and side supports form a vertical wall. Each of the pair of side members has a track system on a storage area facing surface thereof, the track system comprised of at least one set of generally horizontally extending side member tracks, and at least one set of generally vertically extending side member tracks. A removable shelf cooperates with the track system to alternatively divide the storage area into generally vertical or generally horizontal storage compartments. The removable shelf may also be used in cooperation with the track system to provide a front wall, a rear wall, or a cover for the storage unit. The storage unit has an installed position within the storage area of the vehicle in which lock means secure the storage unit to the vehicle panels. The lock means preferably comprise a lock member attached to an outboard surface of the side supports and the side members for releasable engagement with a lock engagement member attached to the vehicle panels. Preferably the lock members are manually operable between a lock position and an unlocked position, without the need for tools.

An advantage of the present invention is a storage unit for an automotive vehicle which can divide a storage area into several horizontal or vertical compartments.

Another advantage of the present invention is a storage unit which provides flexibility for storage of items of varying size and shape.

Yet another advantage is the storage unit which can serve to hide items being stored therein and thus deter theft.

Still another advantage of the present invention is a storage unit which is lightweight and easily portable.

Another advantage is a storage unit which collapses into a convenient, compact shape which takes up little space and can be easily stored.

Yet still another advantage of the present invention is a vehicle storage unit which can be quickly installed and removed.

Another advantage of the present invention is a vehicle storage unit which can be manually installed or removed with out the need for tools.

Another advantage for the present invention is a storage unit which requires minimum revision for attachment of the storage unit thereto.

Another advantage of the present invention is a storage unit which does not move, vibrate, squeak or rattle during vehicle operations.

A feature of the storage unit according to a preferred embodiment of the present invention is a removable shelf which can be positioned in several vertical tracks or horizontal tracks thus dividing the storage space into horizontal or vertical compartments.

Another feature of the present invention is a removable shelf which can be used as a security cover in a topmost horizontal position to deter theft from the vehicle.

Still another feature of the present invention are manually operable thumb wheel and slide lock attachments for securing the storage unit side members to the vehicle when the storage unit is in a installed position.

Another feature of the present invention is a storage unit with foldable side members and a shelf retainer feature which allow the storage unit to collapse into an easily transportable unit.

Yet another feature of the present invention is a molded-in handle which assists in portability and handling of the storage unit.

BRIEF DESCRIPTION OF THE DRAWINGS

These and other objects, advantages and features of the present invention will be apparent to those skilled in the vehicle storage arts upon reading the following description with reference to the accompanying drawings, in which:

FIG. 1 is a rear perspective view of a vehicle storage area showing a storage unit according to a preferred embodiment of the present invention in a transportable position not installed in the storage area;

FIG. 2 is a rear perspective view of a vehicle storage area similar to FIG. 1 but showing the storage unit in an installed position in the storage area;

FIG. 3 is an exploded perspective view of a preferred embodiment of the storage unit according to the present invention shown with side members in a deployed position;

FIG. 4 is a top view of lock means comprising a thumbscrew for attaching the storage unit to the automotive vehicle;

FIG. 5 is a rear side view of the thumbscrew of FIG. 4;

FIG. 7 is a rear view of an edge of the side wall taken along line 7—7 of FIG. 6;

FIG. 8 is a perspective view of a slide lock for attaching a side member of the storage unit to a vehicle panel having a knob protruding therefrom;

FIG. 9 is a cross-sectional view taken along line 9—9 of FIG. 6;

FIG. 10 is a cross-sectional view taken along line 10—10 of FIG. 6;

FIG. 11 is a cross-sectional view taken along line 11—11 of FIG. 6;

FIG. 12 is a cross-sectional view taken along line 12—12 of FIG. 6.

DETAILED DESCRIPTION OF THE PREFERRED EMBODIMENT

Figure 6:
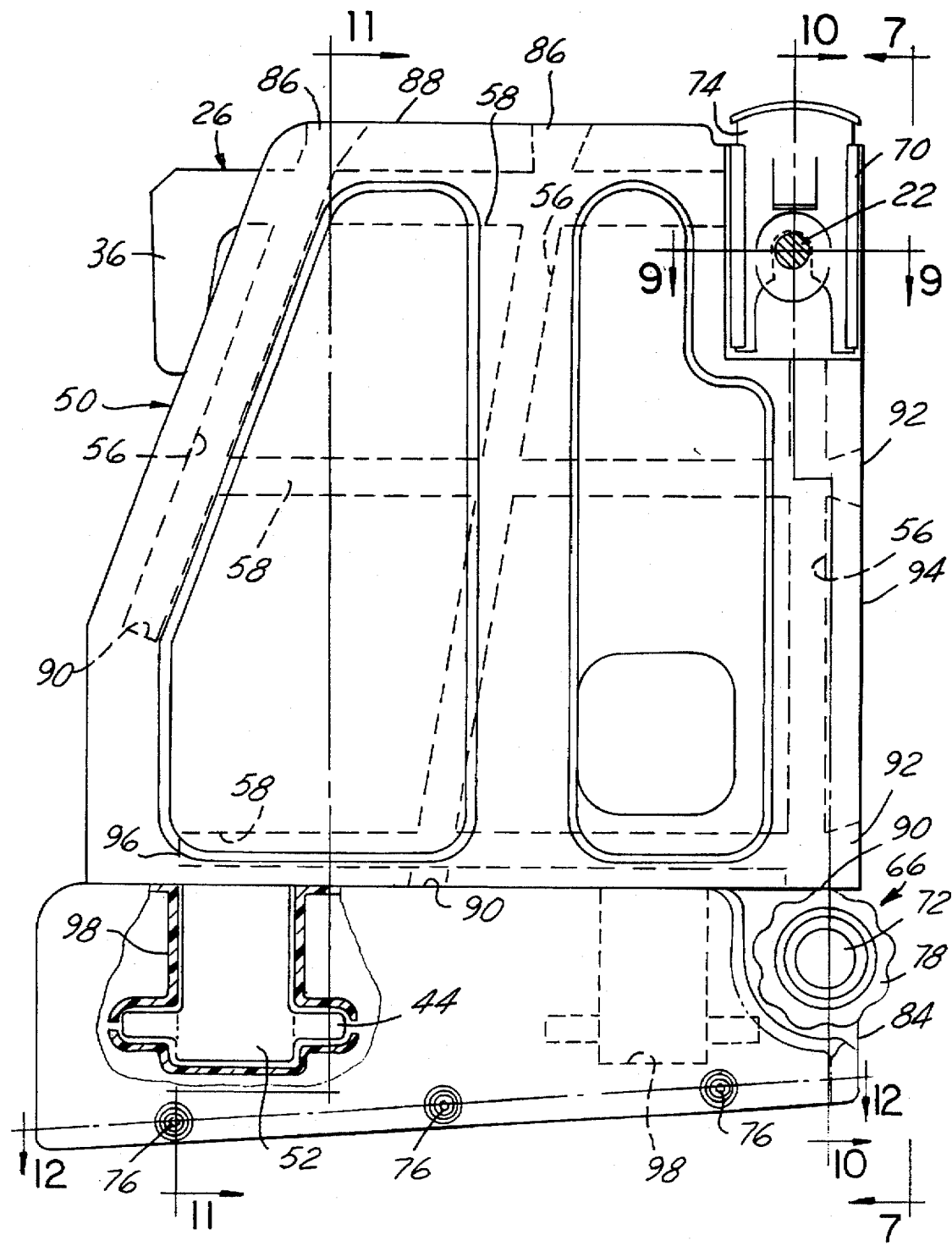
FIG. 6 is a side view of a side wall of the storage unit according to a preferred embodiment of the present invention.

Turning now to the drawings, and in particular to FIG. 1 thereof, a rear view of an automotive vehicle is shown with a lift gate (not shown) raised to reveal a storage area 12. As is typical of mini vans, stations wagons, and hatchback type vehicles, the storage area 12 is located behind a rear seat 14 and is defined by a floor 16 bounded by generally vertically extending vehicle panels 18, such as trim panels attached interiorally to the vehicle rear quarter panels. The storage area thus defined provides a convenient area for storing medium sized items, such as groceries, dirty wet boots, gasoline, tools, and the like. Many vehicles do not come equipped to provide good storage-retention for such items. In addition, many items stored and transported in the storage area of a vehicle, some stored items may tend to soil or ruin a carpet covering the floor 16, and thus protection from such items is required.

Still referring to FIG. 1, a storage unit, generally indicated at 20, can be installed in the storage area 12 to provide a convenient way to store various items. Lock engagement members are provided on a rearmost section of the vertical panels 18 in the form of knobs 22 and cups 24, which interact with lock members on the storage unit 20, as further described below. In FIG. 1, the storage unit 20 is shown in a transportable position prior to installation in the storage area 12.

Figure 13:
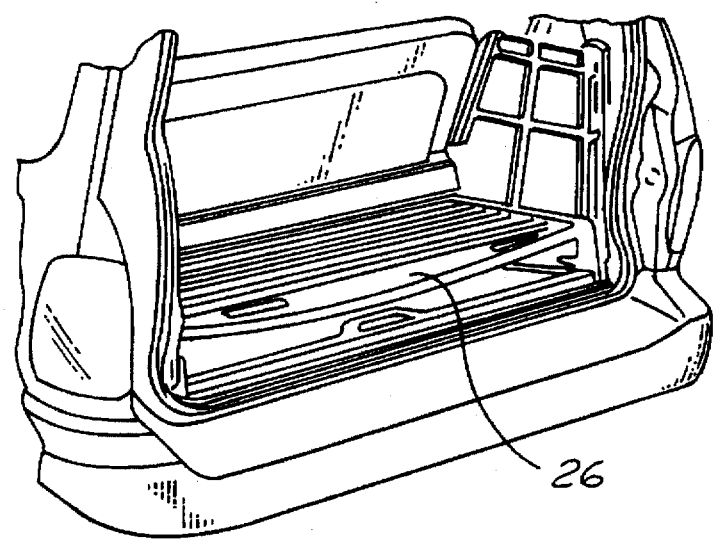
FIG. 13 is a rear perspective view of a vehicle storage area shown with a storage unit according to the present invention in the installed position with a removable shelf placed in a lower horizontal track to divide the storage area into horizontal compartments.

To assist with an understanding of the construction of the storage unit 20, FIG. 2 shows an exploded view of the components of a preferred embodiment thereof. Beginning at the top of FIG. 3, a removable shelf 26, preferably made of a durable polypropylene plastic, has shelf guide members 28, along opposing side edges 30. A top surface 32 of the shelf 26 has laterally extending corrugations 34 to assist in retention of items placed thereon. In addition, the shelf 26 has a flange 36 generally perpendicular to a plane formed by the surface 32 to prevent items from sliding therefrom when the shelf 26 is in a horizontal position, such as seen in FIG. 13.

Figure 19:
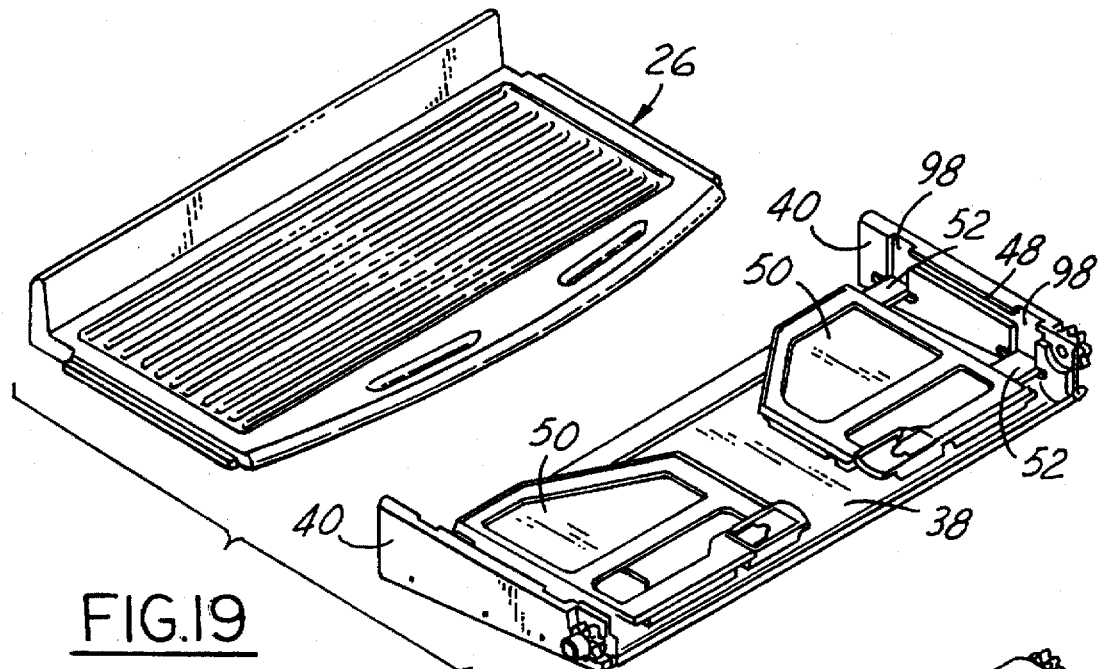
FIG. 19 is a perspective view of a storage unit according to the present invention shown with the side members collapsed onto the base member into a stored position.
Figure 20:
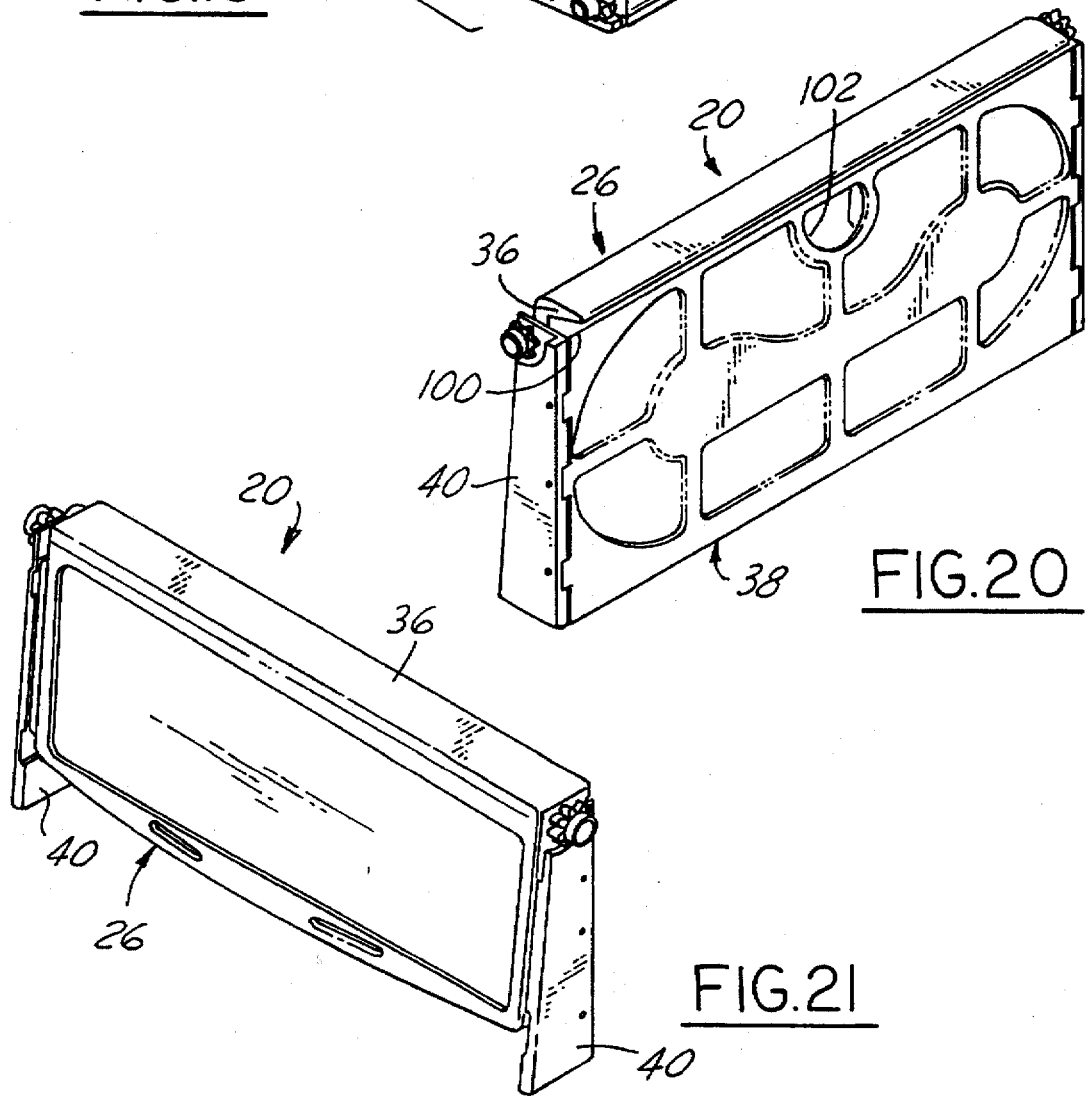
FIG. 20 is a side perspective view of a storage unit according to a preferred embodiment of the present invention shown in a portable position.
Figure 21:
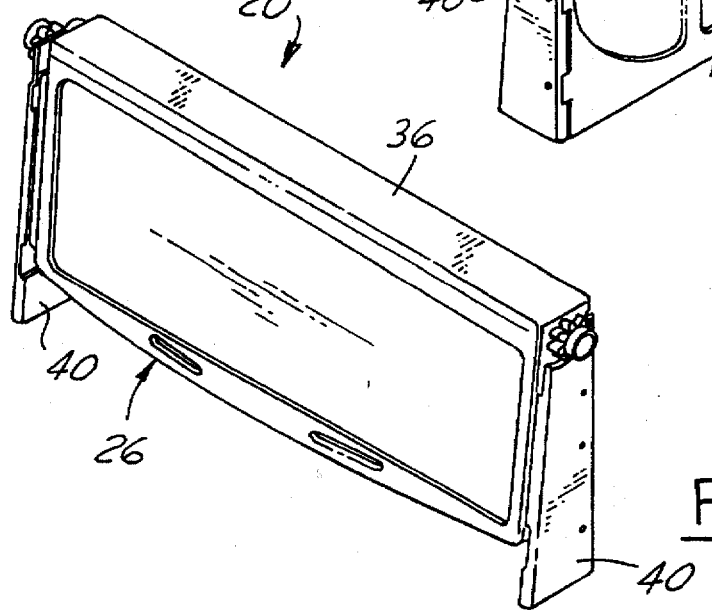
FIG. 21 is a perspective view of the opposite side of the storage unit shown in FIG. 20.

Still referring to FIG. 3, the storage unit 20 has a base 38 which extends substantially between the vehicle side panels 18 when installed in the storage area 12. A pair of side supports 40 are attached at opposing ends of base 38 perpendicularly to a plane formed by the flat surface 42 of the base 38. Each of the pair of side supports 40 has a pair of hinges 44 mounted on an inboard facing surface 46. The side supports 40 also have a generally horizontally extending side support track 48 (FIGS. 3 and 19)for receiving the shelf guide members 28 when the storage unit 20 is in a transportable position, such as shown in FIGS. 1, 20 and 21.

A pair of side members 50 are hingedly attached to the side supports 40 for pivotal movement between a deployed position (FIG. 2) substantially perpendicular to the plane of the base 38. Each side member 50 has a pair of tabs 52 along a bottom edge which attach to the hinges 44 to allow the previously described pivotal movement. The tabs 52 friction fit into slots 98 on surface 46 of side supports 40 when in a deployed position as seen in FIGS. 3 and 6. When the side members 50 are in a stored position (FIG. 19), the tabs 52 rotate on hinges 44 out of the slots 98. The side supports 40, together with the side members 50 when in the deployed position, form a side wall of the storage unit 20, as seen in FIG. 6.

On an inboard facing surface 54 of the side members 50 is a track system for guiding and maintaining the shelf 26 in various horizontal and vertical positions so as to divide the storage area into generally vertical or generally horizontal storage compartments. The track system preferably comprises three generally vertically extending side member tracks 56, and three generally horizontally extending side member tracks 58. One of the vertically extending side member tracks 56 is preferably placed along a forward edge 60 of the side member 50. One of the vertically extending side member tracks 56 is placed along a rear edge 62 of the side member 60, and the third of the vertically extending side member tracks 56 is preferably routed roughly along the center of the surface 54. A first of the horizontally side member tracks 58 is preferably placed near an upper edge 64 of the side member 50. A second of the horizontal side member tracks 58 is placed along a lower edge of the side member 50 adjacent the side support 40, and the third of the horizontally extending side member tracks 58 is routed through the center of the surface 54.

The support members 40 have thumbscrews 66 screwable into an outboard surface 68 of the support members between a first position in which the thumbscrew 66 is disengaged from the cup 24 in the vehicle side panel 18, and a second position in which the thumb screw 66 is engaged in the cup 24 so as to prevent movement of the storage unit 20 relative to the floor 16 and the vehicle side panels 18. Preferably, the side members 50 have a lock sleeve 70 disposed on an outboard facing surface 72 of the side members 50. A lock slide 74 is movable within the lock sleeve 70 between a lock position in which the lock slide 74 engages the knob 22 (FIGS. 1, 6, and 9), and an unlocked position in which the lock slide 74 is disengaged from the knob 22 (FIG. 8).

Attachment of the side supports 40 to the base 38 is preferably by bolts 76 (FIGS. 3, 6, 11, and 12). The side supports are secured to the vehicle panels 18 when the storage unit 20 is in the installed position by way of thumbscrews 66, as best seen in FIG. 10. Thumbscrews 66 have a gnarled portion 78 for easy interaction with a thumb or finger. A screw 80, which screws into the side support 40, and a hub 82 extending from the gnarled portion 78 away from the side support 40 (FIGS. 4–7, and 10). Preferably the thumbscrews 66 are located near a rearward facing edge 84 of the side supports 40 (FIGS. 3 and 6). The thumbscrew 66 is screwable between a first position in which the thumbscrew 66 is disengaged from the cup 24, and a second position in which the thumbscrew 66 is engaged in the cup 24 (FIG. 10) so as to prevent movement of the storage unit 20 relative to the floor 12 and vehicle slide panels 18.

As previously stated, each side member 50 preferably has three generally vertical tracks 56 and three generally horizontal track 58 (FIGS. 1 and 6). Each vertical track 56 has an opening 86 in an upper edge 88 of the slide members 50 for allowing entry of the guide members 28 of the shelf 26 therethrough (FIGS. 6, 7 and 11). Each vertical track 56 also has a stop surface 90 at an end of the track opposite the opening 86 for preventing movement of the shelf 26 downwardly through the track (FIG. 6). Each horizontal track 58 likewise has an opening 92 on a rearward facing side edge 94 of the side members 50 for allowing entry of the shelf 26 therethrough, each horizontal track 58 also having a stop surface 96 at an end of the track opposite the opening 92 for preventing horizontal movement when the shelf 26 is positioned therein (FIG. 6). With the storage unit installed as shown in FIG. 2 and secured to the vehicle panels 18 as described above, the shelf 26 may be placed in any of the vertical tracks 56 or horizontal tracks 58 to alternately divide the storage area into vertical or horizontal compartments.

Figure 14:
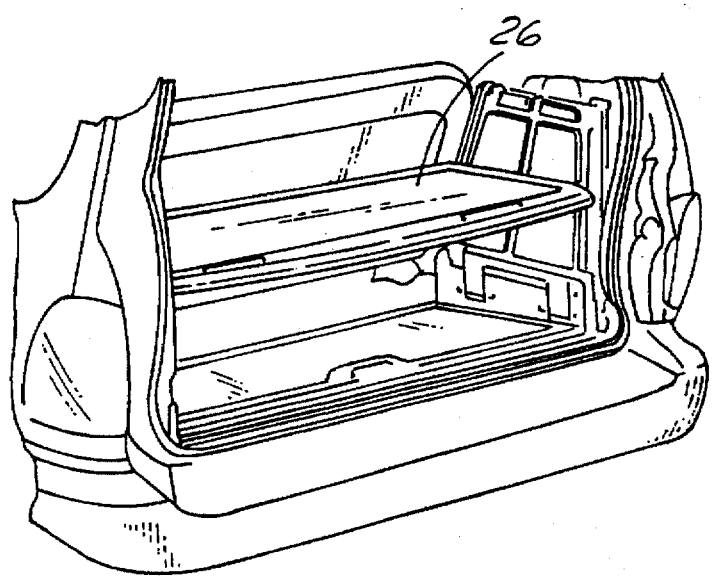
FIG. 14 is a rear perspective view similar to FIG. 13, but showing the removable shelf placed in a center horizontal track to divide the storage area into horizontal compartments.
Figure 15:
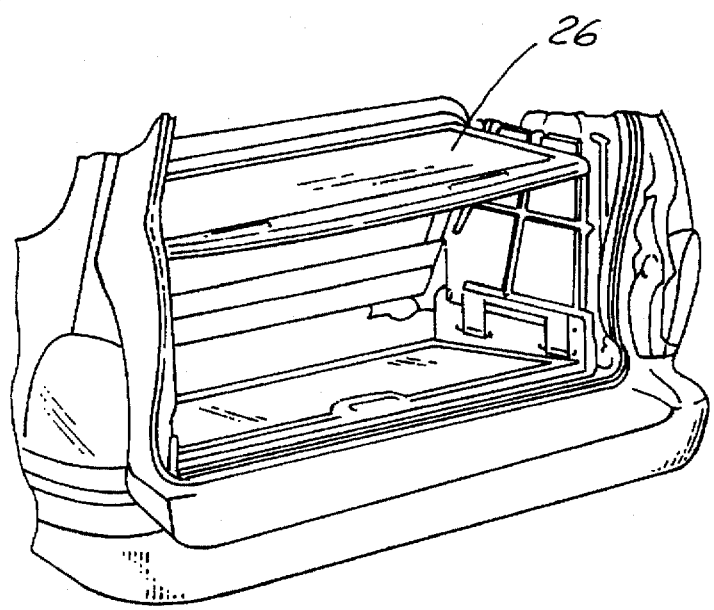
FIG. 15 is a rear perspective view similar to FIG. 13, but showing the removable shelf in an uppermost horizontal track so as to provide a cover for the storage area.

As seen in FIGS. 13 and 14, the shelf 26 can be placed in the lower horizontal track or in the center horizontal track so as to divide the storage area into varying sized horizontal storage compartments. When place in the uppermost horizontal track, the shelf 26 serves as a security cover which prevents outside viewing of items stored in the storage area.

Figure 16:
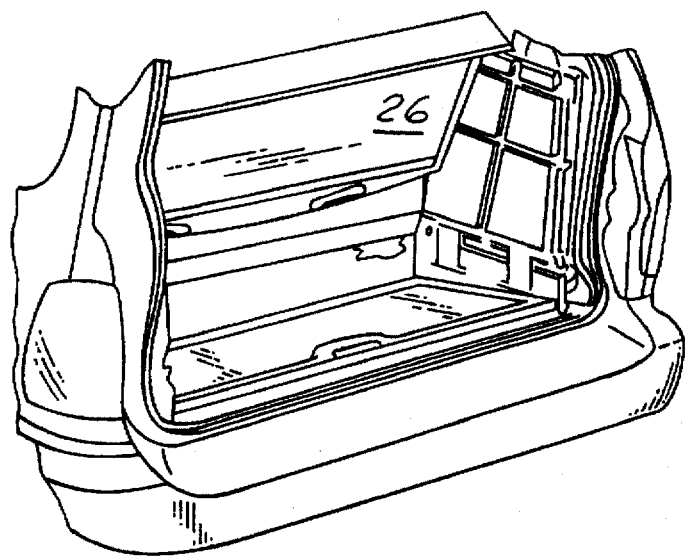
FIG. 16 is a perspective view similar to FIG. 13 but showing the removable shelf in a forwardmost vertical track to provide a forward wall for the storage area.
Figure 17:
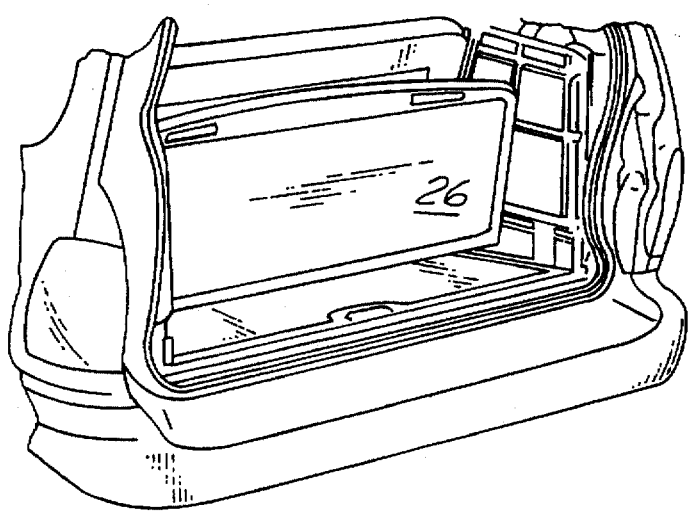
FIG. 17 is a perspective view similar to FIG. 13 but showing the removable shelf in a center vertical track so as to divide the storage area into vertical compartments.
Figure 18:
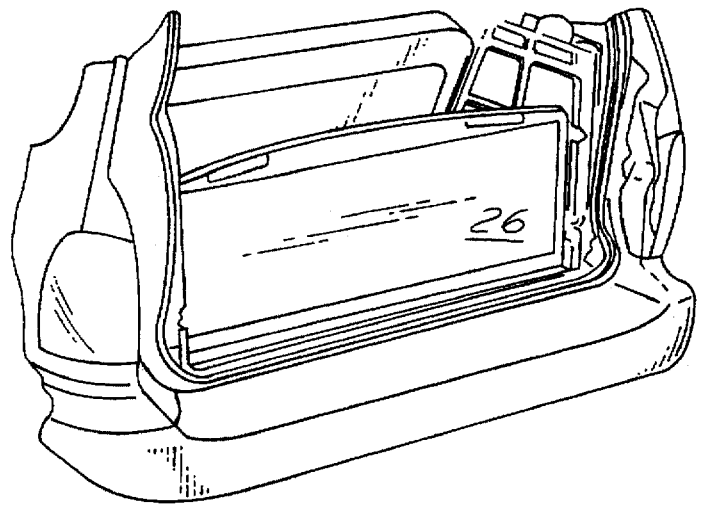
FIG. 18 is a rear perspective view similar to FIG. 13, but showing a removable shelf in a rear most vertical track so as to provide a rear wall for the storage area.

The shelf 26 may also be placed in the vertical tracks 56, as shown in FIGS. 16–18. In FIG. 16, the shelf 26 is shown in a forwardmost vertical track so as to prevent stored items from entering the passenger compartment, or vice versa, to prevent items from the passenger compartment from entering the storage area. When placed in a center vertical track, as seen in FIG. 17, the shelf 26 divides the storage area into two separate vertical storage compartments. The shelf 26 may also be placed in a rearwardmost vertical track so as to prevent stored items from falling from the storage area when the liftgate is opened.

Those skilled in the art will understand that more than one shelf may be used in cooperation with the storage unit so as to provide several or all of the aforedescribed functions. Such shelves may be of varying sizes to alternately or simultaneously divide the storage area into horizontal and vertical compartments.

Removal of the storage unit 20 from the storage space 12 when in an installed position is accomplished by screwing the thumbscrews 66 away from the cups 24 into a flush position with the side supports 40 (FIG. 7). The lockslides 74 are then pulled upward to disengage from the knobs 22 (FIG. 8) so that the side members 50 may move relative to the vehicle panels 18. The shelf 26 may then be removed from its installed position, and the side members 50 may be folded onto the base member 38 as seen in FIG. 19. The shelf 26 is then positioned in the side support tracks 48 with the flange 36 abutting a rearward edge 100 of the base member 38 so as to form a box-like structure as seen in FIGS. 20 and 21. When collapsed as just described, the storage unit 20 is in a transportable position for convenient transit when not installed in the storage area 12. A handle 102, which preferably is molded into the edge 100 of the base member, allows a user to easily grasp and carry the storage unit 20 when in the transportable position.

The invention just described has a polypropylene plastic "floor" shelf for storing dirty, wet items, such as soiled boots, and solvent containers, such as gasoline cans, alcohol bottles, and paint cans. This floor will prevent such items from soiling the carpet. The removable shelf 26 has two horizontal positions (the center and lower horizontal tracks) and a vertical position (the center vertical track) to divide the storage space into smaller, more convenient compartments, thus providing flexibility for the user to store a large variety of items. When in the topmost horizontal track, the removable shelf serves as security cover to hide items placed in the storage area and thus deter theft. When in this position, the shelf may also be used as a package tray to store items on top thereof. As an example of use, when the shelf 26 is in the lowermost horizontal position, skis can easily be stored in the lower horizontal compartment, with ski boots on top of the shelf 26. Those skilled in the art will recognize that this example is merely one many uses for the present invention.

The storage unit is portable and can be manually installed and removed in a very short time. When not installed in the vehicle, the storage unit 20 folds to a convenient, compact shape for easy storage. Once installed properly, this device will not move, vibrate, squeak or rattle. The storage unit 20 is ideal for use in vans or minivans, but can also be used with station wagons and other hatchback type vehicle.

Although the preferred embodiment of the present invention has been disclosed, various changes and modifications may be made without departing from the scope of the invention as set forth in the appended claims.

We claim:

1. A storage unit for an automotive vehicle having a storage area defined by a floor bounded by generally vertically extending vehicle panels, the storage unit comprising;

a base member;

a pair of opposed side members hingedly attached on opposite ends of the base member for pivotal movement onto an upper surface of the base member;

a track system comprising at least one laterally aligned generally vertical track on each of the storage area facing surfaces of the side members and at least one vertically aligned generally horizontal track on each of the storage area facing surfaces of the side members;

removable shelf means cooperative with the track means for alternately dividing the storage area into generally vertical and horizontal compartments; and lock means for securing the storage unit to the vehicle panels.

2. A storage unit according to claim 1 wherein each vertical track has an opening in an upper edge of the side members for allowing entry of the shelf means therethrough, each vertical track also having a stop surface at an end of the track opposite the opening for preventing movement of the shelf means downwardly through the track.

3. A storage unit according to claim 1 wherein each horizontal track has an opening on a side edge of the side members for allowing entry of the shelf means therethrough, each horizontal track also having a stop surface at an end of the at least one track opposite the opening for preventing horizontal movement through the at least one track.

4. In an automotive vehicle having an enclosed cargo storage area including a floor bounded by at least two generally vertically extending vehicle panels, a portable, multi-position vehicle storage unit comprising:

a base member which extends substantially along the width of the storage area when the storage unit is placed therein;

a pair of side supports attached at opposing ends of the base member perpendicularly to a base plane formed thereby, each of the pair of side supports having at least one hinge means mounted therein;

a pair of side members hingedly attached to the pair of side supports for pivotal movement between a deployed position substantially perpendicular to the base plane and a stored position substantially horizontal with the base plane;

at least one removable shelf for alternately dividing the storage area into generally vertical and horizontal compartments; .

a track system on each of the pair of side members for guiding and maintaining the at least one shelf in alternately at least one horizontal position and at least one vertical position;

side member lock means on each of the pair of side members for securing the pair of side members to the vehicle when in the deployed position; and side support lock means on each of the pair of side supports for securing the pair of side supports to the vehicle.

5. A storage unit according to claim 4 wherein the support member lock means and the side member lock means each comprise a lock member attached to an outboard surface of the pair of side supports and the pair of side members, respectively, for releasable engagement with a lock engagement member attached to the at least two vehicle side panels, the lock member manually operable between a lock position and an unlock position without the need for tools.

6. A storage unit according to claim 4 wherein the side member lock means comprises:

a lock sleeve disposed on an outboard facing side of each of the side members; and a slide lock movable within the lock sleeve between a lock position in which the lock slide engages a knob extending from one of the at least two vehicle side panels, and an unlocked position disengaged from the knob.

7. A storage unit according to claim 6 wherein the side member lock means is located near a rearward facing edge of the pair of side members.

8. A storage unit according to claim 4 wherein the support member lock means comprises a thumbscrew screwable into an outboard surface of the support member between a first position in which the thumbscrew is disengaged from a cup in one of the at least two vehicle side panels, and a second position in which the thumbscrew is engaged in the cup so as to prevent movement of the storage unit relative to the floor and the at least two vehicle side panels.

9. A storage unit according to claim 8 wherein the support member lock means is located near a rearward facing edge of the pair of support members.

10. A storage unit for a storage area of an automotive vehicle, the storage area defined by a floor bounded by generally vertically extending vehicle panels including at least two laterally opposed vehicle side panels, the storage unit having an installed position for dividing the storage area into alternately vertical and horizontal storage compartments and collapsible into a transportable position for convenient transit when not installed in the storage area, the storage unit comprising:

a base member extending substantially between the vehicle side panels when the storage unit is in the installed position;

a multiple position shelf system comprising:

a pair of side supports attached at opposing ends of the base member perpendicularly to a base plane formed thereby, each of the pair of side supports having at least one hinge means mounted therein;

a pair of side members hingedly attached to the pair of side supports for pivotal movement between a deployed position substantially perpendicular to the base plane and a stored position substantially horizontal with the base plane;

at least one removable shelf for alternately dividing the storage area into generally vertical and horizontal compartments, the at least one shelf having shelf guide members along opposing side edges thereof;

at least one set of generally horizontally extending side support tracks in the pair of side support members for receiving the shelf guide members when the storage unit is in the transportable position;

at least one set of generally horizontally extending side member tracks in the pair of side members for guiding and maintaining the at least one shelf in at least one horizontal position when the storage unit is the installed position;

at least one set of generally vertically extending side member tracks in the pair of side members for guiding and maintaining the at least one shelf in at least one vertical position when the storage unit is in the installed position;

side member lock means on each of the pair of side members for securing the pair of side members to the vehicle when in the deployed position; and side support lock means on each of the pair of side supports for securing the pair of side supports to the vehicle.

11. A storage unit according to claim 10 wherein the at least one shelf slides into the side support tracks to cover the side members when in the stored position so that the storage unit achieves the transportable position.

12. A storage unit according to claim 11 wherein the at least one shelf has a flange along an edge thereof generally perpendicular to a plane formed by the at least one shelf.

13. A storage unit according to claim 10 wherein the support member lock means and the side member lock means each comprise a lock member attached to an outboard surface of the pair of side supports and the pair of side members, respectively, for releasable engagement with a lock engagement member attached to the at least two vehicle side panels, the lock member manually operable between a lock position and an unlock position without the need for tools.

14. A storage unit according to claim 10 wherein the side member lock means comprises:

a lock sleeve disposed on an outboard facing side of each of the side members; and a slide lock movable within the lock sleeve between a lock position in which the lock slide engages a knob extending from one of the at least two vehicle side panels, and an unlocked position disengaged from the knob.

15. A storage unit according to claim 14 wherein the side member lock means is located near a rearward facing edge of the pair of side members.

16. A storage unit according to claim 10 wherein the support member lock means comprises a thumbscrew screwable into an outboard surface of the support member between a first position in which the thumbscrew is disengaged from a cup in one of the at least two vehicle side panels, and a second position in which the thumbscrew is engaged in the cup so as to prevent movement of the storage unit relative to the floor and the at least two vehicle side panels.

17. A storage unit according to claim 16 wherein the support member lock means is located near a rearward facing edge of the pair of support members.

18. A storage unit according to claim 10 wherein the base member has a handle along a rearward facing edge thereof.

* * * * *